ODD MARK DETECTOR

Filed April 17, 1953

INVENTOR.
TED W. BERWIN
BY Morris Moody
ATTORNEY

United States Patent Office 2,713,084

Patented July 12, 1955

2,713,084

ODD MARK DETECTOR

Ted W. Berwin, Encino, Calif., assignor to Collins Radio Company, Cedar Rapids, Iowa, a corporation of Iowa Application April 17, 1953, Serial No. 349,494

8 Claims. (Cl. 178—23)

Figures 1, 2:
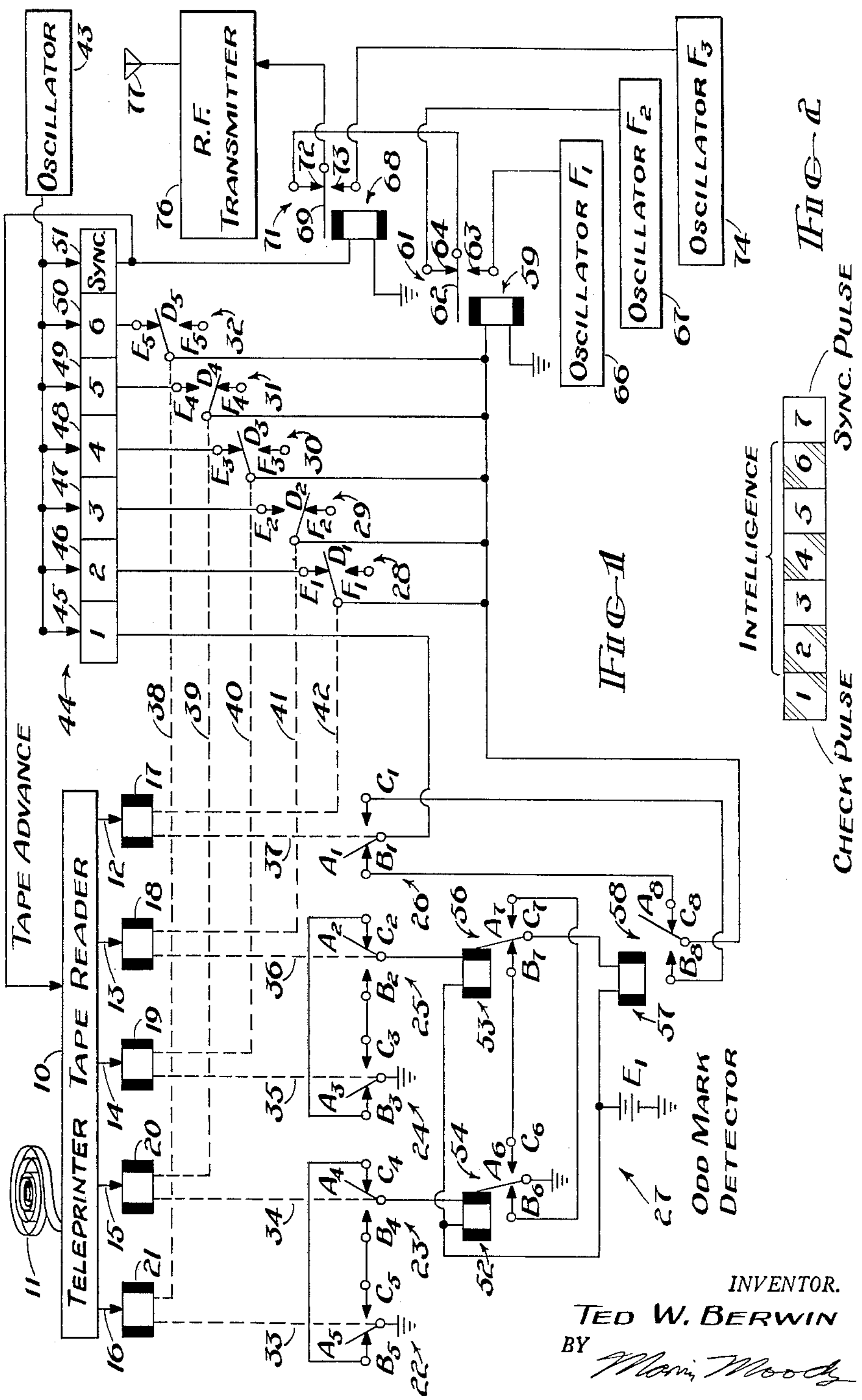

In radio teleprinter communication it is oftentimes desirable to have a system which checks the accuracy of a transmitted character. Such systems oftentimes utilize a mark-space code where each letter comprises a series of five marks and spaces. A mark might correspond to one transmitted frequency and a space to a different frequency. Errors sometimes occur in the transmission of signals. Systems have been developed wherein a sixth pulse is transmitted which may be a mark or space, depending upon the number of marks or spaces in the particular character. For example, suppose that the five pulse character has three marks: Mark, space, mark, space, mark. If the system is designed so that a mark is transmitted during the sixth pulse interval if the total number of marks in the first five is odd, then the receiver has a means of checking the accuracy of the incoming signal.

Applicant proposes to send the check pulse before the character is sent so that the receiver may know that an even or odd number of marks will be transmitted thereafter.

It is an object of this invention therefore to provide a transmitter which transmits a check pulse prior to the transmission of the intelligence to indicate whether the number of marks in a signal is odd or even.

Another object of this invention is to provide an error indicating means that allows the check pulse to be transmitted prior to the intelligence.

Another object is to provide an odd mark indicator.

Further features, objects and advantages will become apparent from the following description and claims when read in view of the drawings, in which:

Figure 1 illustrates a transmitting system according to the present invention; and Figure 2 illustrates a pulse sequence.

Figure 2 illustrates a character that is to be transmitted which is encoded so as to have five pulses, each having one of two conditions. For example, pulses 2, 4 and 6 might be marks and pulses 3 and 5 might be spaces. The first pulse is the check pulse and is a mark to indicate that the number of mark pulses in the sequence from 2 to 6 is an odd number. If the number of marks between pulses 2 and 6 were even, then pulse number 1 would be a space. Pulse number 7 is a synchronizing pulse to keep the receiver synchronized with the transmitter in a well known manner.

Figure 1 illustrates a teleprinter tape reader 10 which might be a conventional type well known to those skilled in the art to which tape 11 is supplied and which has a message encoded thereon. Each character on the tap 11 is read by the teleprinter tape reader 10 which transmits the intelligence on the tape into electrical pulses that are furnished to leads 12, 13, 14, 15 and 16 which correspond to the intelligence time intervals of the signal.

Relays 17, 18, 19 20 and 21 are connected to leads 12, 13, 14, 15 and 16 and are energized if their particular lead supplies a mark signal. Thus, if the intelligence shown at intervals 2 through 6 in Figure 2 is being read by the teleprinter tape reader, relays 17, 19 and 21 will be energized and the relays 18 and 20 will be unenergized. The relays 17 through 21, inclusive, are each connected to two switches with the first group of five switches 22, 23, 24, 25 and 26 forming a part of an odd mark detector, designated generally as 27. The second switches controlled by the relays 17 through 21 are designated as 28, 29, 30, 31 and 32. Mechanical linkages 33 through 37, inclusive, connect the relays to the switches 22 through 26 and mechanical links 38 through 42 connect the relays to switches 28 through 32.

An oscillator 43 is connected to a ring designated generally as 44 so as to produce seven pulses which are sequentially available from the portions 45 through 51 in a time sequence.

Ring oscillators are well known to those skilled in the art and will not be described in detail herein. The present oscillator 43 and ring 44 provide sequential outputs.

If it is assumed that the switches 22 and 26 are to the right when the relays 17 through 21 are de-energized and to the left when they are energized, it will be seen that switches 26, 24 and 22 will be to the left with the intelligence shown in Figure 2. Let it be assumed that switches 28 through 32 which are connected, respectively, to portions 46 through 50 of the ring 44 are in the down or open circuit position when the relays 17 through 21 are de-energized and in the up or closed circuit position when the relays 17 through 21 are energized. Thus, in the example switches 28, 30 and 32 would be closed.

The switches 22 through 26 include movable contacts $A_1$ to $A_5$. $A_3$ and $A_5$ are connected to ground. Each switch has a left contact (relative to Figure 1) indicated by $B_1$ through $B_5$ and a right contact $C_1$ through $C_5$. Contacts $C_5$ and $B_4$ are connected together and $B_5$ and $C_4$. Contacts $B_3$ and $C_2$ and $C_3$ and $B_2$ are connected together. Contacts $A_4$ and $A_2$ are connected, respectively, to the energizing coils of relays 52 and 53. The opposite sides of the relays are connected together and to a suitable voltage source $E_1$ which has its opposite side grounded.

Relay 52 controls the position of a switch 54 which has stationary contacts $B_6$ and $C_6$ and a movable contact $A_6$ that is connected to ground and is normally in the right position relative to Figure 2. Relay 53 controls the position of a movable contact $A_7$ of a switch 56 which has stationary contacts $B_7$ and $C_7$. Contacts $B_6$ and $C_7$ are connected together as are contacts $C_6$ and $B_7$. Movable contact $A_7$ is connected to one side of the energizing coil of a relay 57 which has its opposite side connected to the battery $E_1$.

The relay 57 controls the position of a two-way switch 58 which has its movable contact $A_8$ normally to the right and which moves between contacts $B_8$ and $C_8$. Contacts $B_8$ and $C_1$ are electrically connected together as are contacts $C_8$ and $B_1$.

Movable contact $A_1$ of switch 26 is electrically connected to the output of the first portion 45 of the ring 44. The switches 28 through 32 comprise movable contacts $D_1$ through $D_5$ and stationary contacts $E_1$ through $E_5$ and $F_1$ through $F_5$. Contacts $F_1$ through $F_5$ are open circuited and contacts $E_1$ through $E_5$ are connected, respectively, to portions 46 through 50 of the ring 44. Contacts $D_1$ through $D_5$ are connected to the contact $A_8$ and to the energizing coil of a relay 59 which has its opposite side connected to ground.

Relay 59 controls the position of a switch 61 which has a movable contact 62 and stationary contacts 63 and 64 that are connected, respectively, to oscillators 66 and 67 which produce output frequencies $F_1$ and $F_2$, respectively.

The synchronizing portion 51 of the ring 44 is connected to one side of a relay 68 which has its opposite side connected to ground. Relay 68 controls the position of movable contact 69 of switch 71. Contact 69 moves between contacts 72 and 73. Movable contact 62 is connected to the stationary contact 72 and stationary contact 73 is connected to a third oscillator 74 with an output $F_3$. Movable contact 69 is connected to a transmitter 76 which is connected to a suitable antenna 77.

In operation, the teleprinter tape reader 10 produces outputs that are supplied to the relays 17 through 21 and which depend upon the particular character being transmitted. The relays 17 through 21 remain energized until the tape is advanced by an input to the teleprinter tape reader from the synchronizing portion 51 of the ring 44. It is to be realized that the oscillator 43 successively produces outputs from the ring portions 45 through 51.

The odd mark detector circuit 27 is constructed such that if the positions of the switches 22 through 26 correspond to an odd number of marks, the circuit will be completed from the first portion 45 through switches 26 and 57 to the relay 59 so as to transmit the frequency $F_1$ to the transmitter 76. This may be seen by noting that relay 52 is energized if switches 22 and 23 have opposite positions and is de-energized if they have the same positions. Thus, switch 52 is energized if the number of the inputs to switches 22 and 23 correspond to an odd number of marks.

Likewise, relay 53 is energized if contacts $A_3$ and $A_2$ have opposite positions indicating that an odd number of marks is supplied to these two switches. Relay 57 is energized if switches 54 and 56 have opposite positions. Thus, it is energized when the sum of the inputs to switches 22 through 25 is an odd number of marks. Relay 59 is energized by the ring portion 45 when switches 26 and 58 are in opposite positions. Thus, if the ring portion 45 energizes relay 59 it indicates that the set-up of switches 22 through 26 corresponds to an odd number of marks. When this occurs oscillator 66 will be connected to the transmitter to indicate a mark corresponding to $F_1$ during the first time interval corresponding to the ring portion 45. The ring portions 46 through 50 are connected directly to the relay 59 so as to energize it if a mark is present to transmit the intelligence. The synchronizing pulse from ring portion 51 operates relay 68 so as to connect the oscillator 74 to the transmitter to give a synchronous pulse with a frequency of $F_3$.

Thus, the system disclosed shows a system wherein if the tape reader 10 produces an output with an odd number of mark outputs, a mark will be transmitted during the first time interval to indicate at the receiver that an odd number of marks may be expected. An even number of marks will produce a space during the first time interval corresponding to ring portion 45. Thus, the system provides means for indicating prior to transmission of a character whether the number of marks is odd or even in the character so that a check of the accuracy of the signal is available.

Although it has been described with respect to particular embodiments thereof, it is not to be so limited as changes and modifications may be made therein which are within the full intended scope of the invention, as defined by the appended claims.

I claim:

1. An odd mark detector comprising, a teleprinter tape reader, five relays connected to said teleprinter tape reader, a first group of five switches mechanically connected to said five relays, a second group of five switches mechanically connected to said five relays, sixth and seventh relays with their energizing coils connected, respectively, to the movable contacts of the second and fourth of said first group of five switches, the stationary contacts of the first two of said five switches connected together and the stationary contacts of the third and fourth of said first five switches connected together, the movable contacts of the first and third of said first five switches connected to ground, eleventh and twelfth switches mechanically connected, respectively, to the sixth and seventh relays, the stationary contacts of said eleventh and twelfth switches connected together, the movable contact of the eleventh switch connected to ground, an eighth relay connected to the movable contact of the twelfth switch, a thirteenth switch with its stationary contacts connected to the stationary contacts of the fifth of said first five switches, a voltage source connected to the opposite sides of said sixth, seventh and eighth relays, a first oscillator, a ring connected to said first oscillator to produce a plurality of sequential outputs, a first portion of said ring connected to the movable contact of the fifth of said first group of five switches, second, third, fourth, fifth and sixth portions of said ring connected, respectively, to stationary contacts of the second group of five switches, the movable contacts of said second group of five switches connected electrically together and to the movable contact of the thirteenth switch, a ninth relay connected to the movable contact of the thirteenth switch, a fourteenth switch controlled by said relay, second and third oscillators connected to the stationary contacts of said fourteenth switch, and a radio frequency transmitter connected to the movable contact of said fourteenth switch.

2. An odd mark detector comprising, a teleprinter tape reader, five relays connected to said teleprinter tape reader, a first group of five switches mechanically connected to said five relays, a second group of five switches mechanically connected to said five relays, sixth and seventh relays with their energizing coils connected, respectively, to the movable contacts of the second and fourth of said first group of five switches, the stationary contacts of the first two of said five switches connected together and the stationary contacts of the third and fourth of said first five switches connected together, the movable contacts of the first and third of said first five switches connected to ground, eleventh and twelfth switches mechanically connected, respectively, to the sixth and seventh relays, the stationary contacts of said eleventh and twelfth switches connected together, the movable contact of the eleventh switch connected to ground, an eighth relay connected to the movable contact of the twelfth switch, a thirteenth switch with its stationary contacts connected to the stationary contacts of the fifth of said first five switches, a voltage source connected to the opposite sides of said sixth, seventh and eighth relays, a first oscillator, a ring connected to said first oscillator to produce a plurality of sequential outputs, a first portion of said ring connected to the movable contact of the fifth of said first group of five switches, second, third, fourth, fifth and sixth portions of said ring connected, respectively, to stationary contacts of the second group of five switches, the movable contacts of said second group of five switches connected electrically together and to the movable contact of the thirteenth switch, a ninth relay connected to the movable contact of the thirteenth switch, a fourteenth switch controlled by said relay, second and third oscillators connected to the stationary contacts of said fourteenth switch, a radio frequency transmitter connected to the movable contact of said fourteenth switch, a tenth relay connected to a synchronizing output from said ring, a fifteenth switch controlled by said tenth relay, a movable contact of the fourteenth relay connected to one of the stationary contacts of the fifteenth switch, and a fourth oscillator connected to the other stationary contact of the fifteenth switch.

3. An odd mark detector comprising, a teleprinter tape reader, five relays connected to said teleprinter tape reader, a first group of five switches mechanically connected to said five relays, a second group of five switches mechanically connected to said five relays, sixth and seventh relays with their energizing coils connected, respectively, to the movable contacts of the second and fourth of said first group of five switches, the stationary contacts of the first two of said five switches connected together and the stationary contacts of the third and fourth of said first five switches connected together, the movable contacts of the first and third of said first five switches connected to ground, eleventh and twelfth switches mechanically connected, respectively, to the sixth and seventh relays, the stationary contacts of said eleventh and twelfth switches connected together, the movable contact of the eleventh switch connected to ground, an eighth relay connected to the movable contact of the twelfth switch, a thirteenth switch with its stationary contacts connected to the stationary contacts of the fifth of said first five switches, a voltage source connected to the opposite sides of said sixth, seventh and eighth relays, a first oscillator, a ring connected to said first oscillator to produce a plurality of sequential outputs, a first portion of said ring connected to the movable contact of the fifth of said first group of five switches, second, third, fourth, fifth and sixth portions of said ring connected, respectively, to stationary contacts of the second group of five switches, the movable contacts of said second group of five switches connected electrically together and to the movable contact of the thirteenth switch, a ninth relay connected to the movable contact of the thirteenth switch, a fourteenth switch controlled by said relay, second and third oscillators connected to the stationary contacts of said fourteenth switch, a radio frequency transmitter connected to the movable contact of said fourteenth switch, a tenth relay connected to a synchronizing output from said ring, a fifteenth switch controlled by said tenth relay, a movable contact of the fourteenth relay connected to one of the stationary contacts of the fifteenth switch, a fourth oscillator connected to the other stationary contact of the fifteenth switch, and the output of said synchronizing ring portion connected to said tape reader to advance it to another character.

4. An odd mark detector comprising, eight switches, the movable contact of the first, third and sixth switches connected to ground, the stationary contacts of the first and second switches connected together, the stationary contacts of the second and third switches connected together, the stationary contacts of the sixth and seventh switches connected together, the stationary contacts of the fifth and eighth switches connected together, three relays with the energizing field of the first relay connected electrically to the movable contact of the second switch and mechanically connected to the movable contact of the sixth switch, the second relay electrically connected to the movable contact of the fourth switch and mechanically connected to the movable contact of the seventh switch, the movable contact of the seventh switch electrically connected to the energizing coil of the third relay, and the third relay mechanically connected to the movable contact of the eighth switch, and a closed circuit formed between the movable contacts of the fifth and eighth switches if an odd number of the first five switches are in the same position.

5. An odd mark detector comprising, eight switches, the movable contact of the first, third and sixth switches connected to ground, the stationary contacts of the first and second switches connected together, the stationary contacts of the second and third switches connected together, the stationary contacts of the sixth and seventh switches connected together, the stationary contacts of the fifth and eighth switches connected together, three relays with the energizing field of the first relay connected electrically to the movable contact of the second switch and mechanically connected to the movable contact of the sixth switch, the second relay electrically connected to the movable contact of the fourth switch and mechanically connected to the movable contact of the seventh switch, the movable contact of the seventh switch electrically connected to the energizing coil of the third relay, and the third relay mechanically connected to the movable contact of the eighth switch, a voltage source connected to the opposite sides of the first, second and third relays, and a closed circuit formed between the movable contacts of the fifth and eighth switches if an odd number of the first five switches are in the same position.

6. An odd mark detector comprising, eight switches, the movable contact of the first, third and sixth switches connected to ground, the stationary contacts of the first and second switches connected together, the stationary contacts of the second and third switches connected together, the stationary contacts of the sixth and seventh switches connected together, the stationary contacts of the fifth and eighth switches connected together, three relays with the energizing field of the first relay connected electrically to the movable contact of the second switch and mechanically connected to the movable contact of the sixth switch, and the second relay electrically connected to the movable contact of the fourth switch and mechanically connected to the movable contact of the seventh switch, the movable contact of the seventh switch electrically connected to the energizing coil of the third relay, and the third relay mechanically connected to the movable contact of the eighth switch, a check pulse connected to the movable contact of the fifth switch, and a closed circuit formed between the movable contacts of the fifth and eighth switches if an odd number of the first five switches are in the same position.

7. An odd mark detector comprising, eight switches, the movable contact of the first, third and sixth switches connected to ground, the stationary contacts of the first and second switches connected together, the stationary contacts of the second and third switches connected together, the stationary contacts of the sixth and seventh switches connected together, the stationary contacts of the fifth and eighth switches connected together, three relays with the energizing field of the first relay connected electrically to the movable contact of the second switch and mechanically connected to the movable contact of the sixth switch, the second relay electrically connected to the movable contact of the fourth switch and mechanically connected to the movable contact of the seventh switch, the movable contact of the seventh switch electrically connected to the energizing coil of the third relay, and the third relay mechanically connected to the movable contact of the eighth switch, a closed circuit formed between the movable contacts of the fifth and eighth switches if an odd number of the first five switches are in the same position, and fourth, fifth, sixth, seventh and eighth relays mechanically connected, respectively, to the first five switches to control their positions.

8. An odd mark detector comprising, eight switches, the movable contact of the first, third and sixth switches connected to ground, the stationary contacts of the first and second switches connected together, the stationary contacts of the second and third switches connected together, the stationary contacts of the sixth and seventh switches connected together, the stationary contacts of the fifth and eighth switches connected together, three relays with the energizing field of the first relay connetced electrically to the movable contact of the second switch and mechanically connected to the movable contact of the sixth switch, the second relay electrically connected to the movable contact of the fourth switch and mechanically connected to the movable contact of the seventh switch, the movable contact of the seventh switch electrically connected to the energizing coil of the third relay, and the third relay mechanically connected to the movable contact of the eighth switch, a closed circuit formed between the movable contacts of the fifth and eighth switches if an odd number of the first five switches are in the same position, fourth, fifth, sixth, seventh and eighth relays mechanically connected, respectively, to the first five switches to control their positions, and a teleprinter tape reader producing a plurality of electrical inputs which are connected, respectively, to the fourth, fifth, sixth, seventh and eighth relays.

References Cited in the file of this patent

UNITED STATES PATENTS

| | | |
|---|---|---|
| 2,460,702 | Mallery | Feb. 1, 1949 |
| 2,473,202 | Higgitt | June 14, 1949 |
| 2,603,705 | Van Duuren | July 15, 1952 |